United States Patent
Hannuksela et al.

(10) Patent No.: US 7,724,818 B2
(45) Date of Patent: May 25, 2010

(54) METHOD FOR CODING SEQUENCES OF PICTURES

(75) Inventors: Miska Hannuksela, Tampere (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1099 days.

(21) Appl. No.: 10/426,928

(22) Filed: Apr. 30, 2003

(65) Prior Publication Data

US 2004/0218668 A1 Nov. 4, 2004

(51) Int. Cl.
*H04N 7/12* (2006.01)
(52) U.S. Cl. .............................. 375/240.01; 375/240.29
(58) Field of Classification Search ............ 375/240.14, 375/240.01, 240.28, 240.25, 240.29, 240.1; 348/473; 709/201; 725/95
See application file for complete search history.

(56) References Cited

U.S. PATENT DOCUMENTS

| | | | | |
|---|---|---|---|---|
| 5,515,107 | A * | 5/1996 | Chiang et al. ............... | 348/473 |
| 5,838,265 | A | 11/1998 | Adolph | |
| 6,414,608 | B1 | 7/2002 | Nishida et al. | |
| 6,646,578 | B1 | 11/2003 | Au | |
| 7,072,393 | B2 * | 7/2006 | Boice et al. ............ | 375/240.01 |
| 7,227,901 | B2 * | 6/2007 | Joch et al. .............. | 375/240.29 |
| 2003/0012275 | A1 * | 1/2003 | Boice et al. ............ | 375/240.01 |
| 2004/0008766 | A1 | 1/2004 | Wang et al. | |
| 2004/0008786 | A1 | 1/2004 | Boyce | |
| 2004/0010802 | A1 * | 1/2004 | Visharam et al. .............. | 725/95 |
| 2004/0013202 | A1 | 1/2004 | Lainema | |
| 2004/0199565 | A1 * | 10/2004 | Visharam et al. ............ | 709/201 |

FOREIGN PATENT DOCUMENTS

| | | |
|---|---|---|
| EP | 0322123 | 6/1989 |
| RU | 2073913 | 2/1997 |
| RU | 2201654 | 3/2003 |
| WO | WO 02/15589 | 2/2002 |

OTHER PUBLICATIONS

"H.26L over IP and H.324 Framework"; ITU-Telecommunications Standardization Sector, Study Group 16 Question 6, Video Coding Experts Group (VCEG); Fourteenth Meeting, Santa Barbara, CA; Sep. 2001.

* cited by examiner

*Primary Examiner*—Gims S Philippe
(74) *Attorney, Agent, or Firm*—Ware, Fressola, Van Der Sluys & Adolphson LLP

(57) ABSTRACT

A method for encoding sequences of pictures into a bitstream, wherein parameters are defined in a parameter set and each picture comprises information of one or more slices. The method comprises defining parameters in a sequence parameter set; defining parameters in a picture parameter set; and defining at least one picture parameter in a slice header. The picture parameter remains unchanged at least in all slice headers of one picture.

23 Claims, 4 Drawing Sheets

METHOD FOR CODING SEQUENCES OF PICTURES

FIELD OF THE INVENTION

The present invention relates to a method for coding sequences of pictures into a bitstream, wherein parameters are defined in a parameter set and each picture comprises information of one or more slices. The invention further relates to a method for decoding sequences of pictures from a bitstream, wherein parameters are defined in a parameter set and each picture comprises information of one or more slices. The invention also relates to a system, transmitting device, receiving device, an encoder, a decoder, an electronic device, a software program, a storage medium, and a bitstream.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.

There is a standardization effort going on in a Joint Video Team (JVT) of ITU-T and ISO/IEC. The work of JVT is based on an earlier standardization project in ITU-T called H.26L. The goal of the JVT standardization is to release the same standard text as ITU-T Recommendation H.264 and ISO/IEC International Standard 14496-10 (MPEG-4 Part 10). The draft standard is referred to as the JVT coding standard in this application, and the codec according to the draft standard is referred to as the JVT codec.

Video Communication Systems

Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming.

In the following, some terms relating to video information are defined for clarity. A frame contains an array of luma samples and two corresponding arrays of chroma samples. A frame consists of two fields, a top field and a bottom field. A field is an assembly of alternate rows of a frame. A picture is either a frame or a field. A coded picture is either a coded field or a coded frame. In the JVT coding standard, a coded picture consists of one or more slices. A slice consists of an integer number of macroblocks, and a decoded macroblock corresponds to a 16×16 block of luma samples and two corresponding blocks of chroma samples. In the JVT coding standard, a slice is coded according to one of the following coding types: I (intra), P (predicted), B (bi-predictive), SI (switching intra), SP (switching predicted). A coded picture is allowed to contain slices of different types. All types of pictures can be used as reference pictures for P, B, and SP slices. The instantaneous decoder refresh (IDR) picture is a particular type of a coded picture including only slices with I or SI slice types. No subsequent picture can refer to pictures that are earlier than the IDR picture in decoding order. In some video coding standards, a coded video sequence is an entity containing all pictures in the bitstream before the end of a sequence mark. In the JVT coding standard, a coded video sequence is an entity containing all coded pictures from an IDR picture (inclusive) to the next IDR picture (exclusive) in decoding order. In other words, a coded video sequence according to the JVT coding standard corresponds to a closed group of pictures (GOP) according to MPEG-2 video.

Conventional video coding standards have specified a structure for an elementary bitstream, i.e., a self-containing bitstream that decoders can parse. The bitstream has consisted of several layers, typically including several of the following: a sequence layer, a group of pictures (GOP) layer, a picture layer, a slice layer, a macroblock layer, and a block layer. The bitstream for each layer typically comprises a header and associated data.

The codec specification itself distinguishes conceptually between a video coding layer (VCL), and the network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL are slices: a bit string that contains the macroblock data of an integer number of macroblocks, and the information of the slice header (containing the spatial address of the first macroblock in the slice, the initial quantization parameter, and similar). Macroblocks in slices are ordered in scan order unless a different macroblock allocation is specified, using the so-called Flexible Macroblock Ordering syntax. In-picture prediction is used only within a slice.

The NAL encapsulates the slice output of the VCL into Network Abstraction Layer Units (NALUs), which are suitable for the transmission over packet networks or the use in packet oriented multiplex environments. All NAL units relating to a certain picture form an access unit. JVT's Annex B defines an encapsulation process to transmit such NALUs over byte-stream oriented networks. A stream of NAL units does not form an elementary bitstream as such because there are no start codes in NAL units, but rather NAL units have to be framed with start codes according to Annex B of the JVT coding standard to form an elementary bitstream.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Parameter Set Concept

The JVT coding standard contains headers at slice layer and below, but it does not include picture, GOP, or sequence headers. Instead, a concept of a parameter set, introduced in ITU-T document VCEG-N55, replaces such headers. An instance of a parameter set includes all picture, GOP, and sequence level data such as picture size, display window, optional coding modes employed, macroblock allocation map, and others. Each parameter set instance includes a unique identifier. Each slice header includes a reference to a parameter set identifier, and the parameter values of the referred parameter set are used when decoding the slice. Parameter sets decouple the transmission and decoding order of infrequently changing picture, GOP, and sequence level data from sequence, GOP, and picture boundaries. Parameter sets can be transmitted out-of-band using a reliable transmission protocol as long as they are decoded before they are referred. If parameter sets are transmitted in-band, they can be repeated multiple times to improve error resilience compared to conventional video coding schemes. Preferably the parameter sets are transmitted at a session set-up time. However, in some systems, mainly broadcast ones, reliable out-of-band transmission of parameter sets is not feasible, but rather parameter sets are conveyed in-band in Parameter Set NAL units.

In order to be able to change picture parameters (such as the picture size), without having the need to transmit Parameter Set updates synchronously to the slice packet stream, the encoder and decoder can maintain a list of more than one Parameter Set. Each slice header contains a codeword that indicates the Parameter Set to be used.

This mechanism allows decoupling of the transmission of the Parameter Sets from the packet stream, and transmit them by external means, e.g. as a side effect of the capability exchange, or through a (reliable or unreliable) control protocol. It may even be possible that they are never transmitted but are fixed by an application design specification.

There are some disadvantages with pre-defined parameter sets. First, if there is a need to transmit many parameter set instances in the beginning of a session, the out-of-band method may become overburdened or the beginning latency of the session will be too long. Second, in systems lacking feasible mechanisms for reliable out-of-band transmission of parameter sets, in-band transport of Parameter Set NAL units is not reliable. Third, for broadcast applications, since the parameter sets information should be transmitted frequently to allow new users join during the broadcast process, redundant transmission of all the active parameter set instances is costly from bit-rate point of view.

Transmission of Multimedia Streams

A multimedia streaming system consists of a streaming server and a number of players, which access the server via a network. The network is typically packet-oriented and provides little or no means to guarantee quality of service. The players fetch either pre-stored or live multimedia content from the server and play it back in real-time while the content is being downloaded.

The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

SUMMARY OF THE INVENTION

One aim of the present invention is to avoid the problems of prior art and provide a more efficient method to transmit parameters relating to picture information. According to an advantageous embodiment of the present invention, the following method for parameter set signalling is provided:

A relatively large number of frequently used parameter set instances and their IDs are pre-defined and stored both in an encoding device and in a decoding device. When the communication starts, these pre-defined parameter sets need not be transmitted. Only the parameter sets not included in the pre-defined ones have to be transmitted, preferably at the session beginning, or transmitted in parameter set NAL units later if necessary. The system could include a definition of default parameter sets for each profile and level.

According to the invention, there exist at least two kinds of parameter sets: one for the sequence (sequence parameter set) and one for the pictures (picture parameter set).

For applications without feedback channels (digital TV) or with feedback channels of very limited use (e.g. multicast streaming with a huge number of receivers), the set of pre-defined parameter sets should be as complete as possible, from the point of view of possible systems and application scenarios. Therefore, it may be possible that no parameter sets need to be transmitted. Once a parameter set NAL unit is needed, it should be transmitted multiple times to ensure that it is correctly received.

Another inventive concept of the present invention splits the parameter set structure to multiple parameter set structures according to the persistency and target of parameters. In particular, the invention includes the concepts of sequence parameter set and picture parameter set. The selection of a correct parameter set for each parameter depends on the probable and allowed changing rate of the parameter. Parameters whose value may change in every slice or whose value is likely to change in every picture, are included in the slice header. If it is probable that a parameter remains unchanged in multiple pictures but is allowed to change in every picture, such parameter is included in a picture parameter set. Such parameters which are not allowed to change in a coded video sequence are included in the sequence parameter set. Some non-restrictive examples of such parameters are picture order count, frame number and identifier of an independently decodable picture.

In the following description the invention is described by using encoder-decoder based system, but it is obvious that the invention can also be implemented in systems in which the video signals are stored. The stored video signals can be either uncoded signals stored before encoding, encoded signals stored after encoding, or decoded signals stored after encoding and decoding process. For example, an encoder produces bitstreams. A file system receives audio and/or video bitstreams which are encapsulated e.g. in decoding order and stored as a file.

The encoding method according to the present invention is primarily characterized in that the method comprises:
defining parameters in a sequence parameter set;
defining parameters in a picture parameter set; and
defining at least one picture parameter in a slice header, the picture parameter remaining unchanged at least in all slice headers of one picture.

The decoding method according to the present invention is primarily characterized in that the method comprises:
recognizing a sequence parameter set and forming at least one sequence parameter pertaining to a sequence using the parameter set;
recognizing a picture parameter set and forming at least one first picture parameter pertaining to a picture using the parameter set; and
forming at least one second picture parameter using information of a slice header, the at least one second picture parameter remaining unchanged at least in all slice headers of one picture
using the at least one second picture parameter in decoding.

The encoder according to the present invention is primarily characterized in that it comprises:
means for defining parameters in a sequence parameter set;
means for defining parameters in a picture parameter set; and means for defining at least one picture parameter in a slice header, the picture parameter remaining unchanged at least in all slice headers of one picture.

The decoder according to the present invention is primarily characterized in that the it comprises:
- means for recognizing a sequence parameter set and forming at least one sequence parameter pertaining to a sequence using the parameter set;
- means for recognizing a picture parameter set and forming at least one first picture parameter pertaining to a picture using the parameter set;
- means for forming at least one second picture parameter using information of a slice header, the at least one second picture parameter remaining unchanged at least in all slice headers of one picture; and
- means for using the at least one second picture parameter in decoding.

The system according to the present invention is primarily characterized in that the encoder comprises:
- means for defining parameters in a sequence parameter set;
- means for defining parameters in a picture parameter set; and
- means for defining at least one picture parameter in a slice header, the picture parameter remaining unchanged at least in all slice headers of one picture;

and the decoder comprises:
- means for recognizing a sequence parameter set and forming at least one sequence parameter pertaining to a sequence using the parameter set;
- means for recognizing a picture parameter set and forming at least one first picture parameter pertaining to a picture using the parameter set;
- means for forming at least one second picture parameter using information of a slice header, the at least one second picture parameter remaining unchanged at least in all slice headers of one picture; and
- means for using the at least one second picture parameter in decoding.

The transmitting device according to the present invention is primarily characterized in that the encoder comprises:
- means for defining parameters in a sequence parameter set;
- means for defining parameters in a picture parameter set; and
- means for defining at least one picture parameter in a slice header, the picture parameter remaining unchanged at least in all slice headers of one picture.

The receiving device according to the present invention is primarily characterized in that the decoder comprises:
- means for recognizing a sequence parameter set and forming at least one sequence parameter pertaining to a sequence using the parameter set;
- means for recognizing a picture parameter set and forming at least one first picture parameter pertaining to a picture using the parameter set;
- means for forming at least one second picture parameter using information of a slice header, the at least one second picture parameter remaining unchanged at least in all slice headers of one picture; and
- means for using the at least one second picture parameter in decoding.

The bitstream according to the present invention is primarily characterized in that it comprises:
- encoded pictures;
- sequence parameters in a sequence parameter set;
- picture parameters in a picture parameter set;
- information of a slice comprising a slice header; and
- at least one picture parameter in the slice header, the picture parameter remaining unchanged at least in all slice headers of one encoded picture.

The software program for encoding according to the present invention is primarily characterized in that the software program comprises:
- defining parameters in a sequence parameter set;
- defining parameters in a picture parameter set; and
- defining at least one picture parameter in a slice header, the picture parameter remaining unchanged at least in all slice headers of one picture.

The software program for decoding according to the present invention is primarily characterized in that the software program comprises: the software program comprising:
- recognizing a sequence parameter set and forming at least one sequence parameter pertaining to a sequence using the parameter set;
- recognizing a picture parameter set and forming at least one first picture parameter pertaining to a picture using the parameter set;
- forming at least one second picture parameter using information of a slice header, the at least one second picture parameter remaining unchanged at least in all slice headers of one picture; and
- using the at least one second picture parameter in decoding.

The storage medium including the software program for encoding according to the present invention is primarily characterized in that the software program comprises machine executable steps for:
- defining parameters in a sequence parameter set;
- defining parameters in a picture parameter set; and
- defining at least one picture parameter in a slice header, the picture parameter remaining unchanged at least in all slice headers of one picture.

The storage medium including the software program for decoding according to the present invention is primarily characterized in that the software program comprises machine executable steps for:
- recognizing a sequence parameter set and forming at least one sequence parameter pertaining to a sequence using the parameter set;
- recognizing a picture parameter set and forming at least one first picture parameter pertaining to a picture using the parameter set;
- forming at least one second picture parameter using information of a slice header, the at least one second picture parameter remaining unchanged at least in all slice headers of one picture; and
- using the at least one second picture parameter in decoding.

The present invention improves compression efficiency. It is likely that the number of picture parameter sets is larger than the number of sequence parameter sets and the frequency of updating picture parameter sets is higher than the frequency of updating sequence parameter sets. Thus, if there were a single parameter set structure, many sequence-level parameters that remained unchanged in the previous picture parameter set (in decoding order) should be repeated. Including picture and sequence level parameters in different syntax structures helps to avoid this problem.

The present invention clarifies the persistency rules of parameter values. Certain parameter values, such as the picture size, shall remain unchanged within the sequence. Other parameter values may change from picture to picture. If there were a single parameter set structure, there should be semantic restrictions, which parameter values must not change within a sequence even though the referred parameter set may change within the sequence. Now that the sequence parameter set structure is specified, it is clear that all picture parameter sets that are referred to within a sequence must refer to the same sequence parameter set. Moreover, it is clear that all slices of a picture must refer to the same picture parameter set.

DETAILED DESCRIPTION OF THE INVENTION

In an advantageous embodiment of the present invention four parameter ser structures are defined: an independent GOP parameter set or a sequence parameter set, a picture parameter set, a slice parameter set, and, optionally, a presentation parameter set. Some reasons for the definition of the different parameter sets are as follows:

First, certain parameter values must remain unchanged throughout an independent GOP or within a picture. For example, the number of picture "slots" in a multi-picture buffer must not be changed during an independent GOP. Otherwise, it would be unclear how the multi-picture buffering process operates. A decoder implementation has to ensure that all the slices of a particular picture refer to the same picture parameter set. Similarly, all the slices of an independent GOP must refer to the same independent GOP parameter set. Otherwise, decoders should infer data loss or corruption. Obtaining the same functionality with one joint parameter set requires that the decoder checks that individual parameter values remain the same within a picture or within an independent GOP.

Second, a compact syntax for parameter sets is advantageous to save bits in Parameter set NAL units. Thus, it makes sense to separate independent GOP and picture parameter sets from more frequently updated slice parameter sets.

Third, display-related parameter values do not affect decoding of a coded video stream.

Figure 1:
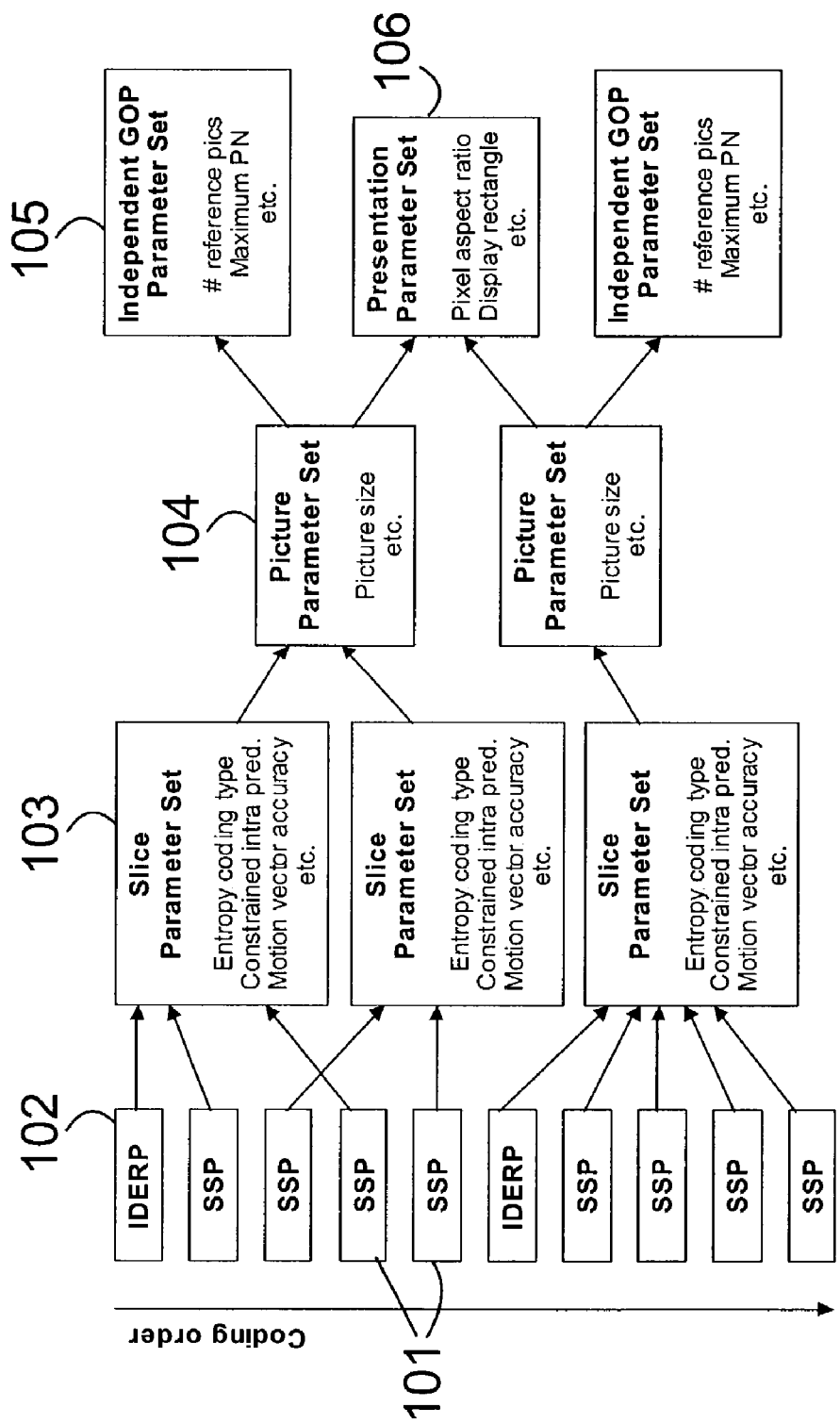
FIG. 1 presents an illustration of dependencies between NAL packets and parameter set instances.

FIG. 1 presents an illustration of dependencies between NAL packets and parameter set instances. An arrow indicates a reference based on a parameter set identifier. The starting point of an arrow is the entity, which refers to the parameter set instance where the arrow points. The ending point of an arrow is the owner of the parameter set identifier. A slice (or a Single slice, SSP) 101, slice data partition, and IDR NAL units (IDE RP) (or independent decoder refresh NAL packets) 102 always refer to a slice parameter set 103. A slice parameter set 103 refers to a picture parameter set 104, and a picture parameter set 104 refers to both an independent GOP parameter set 105 and a presentation parameter set 106, or to a sequence parameter set. All the slices of a picture should refer to the same picture parameter set and all the slices of a sequence should refer to the same sequence parameter set.

Next, the different parameter sets according to an advantageous embodiment of the present invention will be described in more detail.

Independent GOP Parameter Set

The start of an independent GOP is identified by an Instantaneous Decoder Refresh NAL packet (IDERP). An advantageous syntax of the packet is presented in Table 1.

TABLE 1

Independent GOP Parameter Set:

parameter_set_id
Profile
Level
Version
log2_max_picture_number_minus_4
number_of_reference_picture_buffers_minus_1
required_picture_number_update_behavior The meaning of the fields of the packet will now be explained. The profile field defines the coding profile in use; the level field defines the level in use within the profile; the version field defines the version in use within the profile and the level. The next field, log2_max_picture_number_minus_4, specifies the MAX_PN constant used in picture number related arithmetic. MAX_PN is calculated by raising 2 to the power of the value of this field (log2_max_picture_number_minus_4) and decrementing the calculated power of 2 by 1. The field number_of_reference_picture_buffers_minus_1 defines the total number of short- and long-term picture buffers in the multi-picture buffer. If the value of the required_picture_number_update_behavior field is 1, a specific decoder behavior in case of missing picture numbers is mandated. However, this is outside the scope of the present invention wherein it is not described in this application.

Profile, level, and version are very likely to remain unchanged in an independent GOP. Therefore, they are included in the independent GOP parameter set.

A change in reference picture buffering controls, i.e., MAX_PN, number of reference picture buffers, and required picture number update behavior, would cause an undefined decoder state. A change of these parameters in the middle of an independent GOP would not bring any benefits. Hence, the number of reference picture buffers is informed in the independent GOP parameter set. A range from 0 to 15 is considered to be a practical minimum for a picture number, and therefore smaller values are should be avoided.

Picture Parameter Set

The picture parameter set includes the fields presented in Table 2.

TABLE 2

Picture Parameter Set parameter_set_id of a picture_parameter_set
parameter_set_id of an independent GOP parameter set
parameter_set_id of a presentation parameter set
picture_width_in_MBs_minus_1
picture_height_in_MBs_minus_1

The first parameter_set_id field indicates the picture_parameter_set in question. The other two parameter sets indicate the independent GOP parameter set and the presentation parameter set which will be used together with the picture parameter set in encoding and decoding of the slices referring to the picture parameter set. More than one picture parameter sets can refer to the same independent GOP parameter set and/or to the same presentation parameter set. The picture_width_in_MBs_minus_1 field and the picture_height_in_MBs_minus_1 field define the size of the picture.

In some embodiments the picture_width_in_MBs_minus_1 field and picture_height_in_MBs_minus_1 field could reside in the independent GOP parameter set as well.

The presentation parameter set is referred to in picture level, as it is necessary to allow changes in the presentation parameters on picture-by-picture basis. For example, the presentation parameter set signals the display rectangle of the reconstructed pictures, which is directly related to the coded picture size signaled in the picture parameter set.

Slice Parameter Set

The slice parameter set includes the fields presented in Table 3.

TABLE 3

Slice Parameter Set parameter_set_id of a slice parameter set
parameter_set_id of a picture parameter set
entropy_coding
motion_resolution
constrained_intra_prediction_flag
multiple_prediction_frames_flag The entropy_coding field indicates the VLC coding type of WD2. If the value of the entropy_coding field equals to zero it indicates that non-arithmetic VLC coding of WD2 is used, whereas value one indicates that arithmetic coding VLC coding of WD2 is used.

The motion_resolution field gives information on motion resolution. If the value of the motion_resolution field equals to zero a ¼-sample motion resolution is in use, and if the value equals to one a ⅛-sample motion resolution is in use.

The constrained_intra_prediction_flag is used to provide information on prediction mode. If the constrained_intra prediction flag equals to zero normal intra prediction is used, whereas one stands for the constrained intra prediction. In the constrained intra prediction mode, no intra prediction is done from inter macroblocks.

The multiple_prediction_frames_flag gives information on reference picture usage for motion compensation. The multiple_prediction_frames_flag equal to zero signals that only the previous coded picture in coding order is used as a reference picture for motion compensation in P- and SP-frames and the most recent previous decoded and subsequent decoded pictures are used for motion compensation in B-frames. Otherwise, the reference picture(s) for prediction must be signaled for each macroblock.

The selected parameters for the slice parameter set were such that no reason to restrict their values to be unchanged in an entire independent GOP was found. Instead, it might be advantageous to allow changes in parameter values even within a picture. Examples of possible advantages include:

Use of multiple reference pictures. It may make sense to restrict the number of reference pictures to one for certain parts of the picture. For example, in wireline video conferencing equipment, the encoder may treat the center of the picture better than the edges.

Entropy coding type. It may be possible to mix multiple coded video streams to one without decoding the streams. This can be beneficial in a multi-point control unit (MCU) of a video conferencing system, for example. One endpoint may use a different entropy coding method than another one. Thus, the "mixed" stream would contain multiple entropy coding types in a same "mixed" coded picture.

Presentation Parameter Set

The presentation parameter set includes the fields presented in Table 4.

TABLE 4

Presentation Parameter Set parameter_set_id of a presentation parameter set
pixel_aspect_ratio_width
pixel_aspect_ratio_height
display_rectangle_offset_top
display_rectangle_offset_left
display_rectangle_offset_bottom
display_rectangle_offset_right The displayed pixel aspect ratio should be pixel_aspect_ratio_width:pixel_aspect_ratio_height. The parameter values shall be relatively prime. Value 0 is preferably forbidden. The display_rectangle_offset_top field, display_rectangle_offset_left field, display_rectangle_offset_bottom field, and display_rectangle_offset_right field define the rectangle to be displayed from the coded picture. Sample units are used.

Parameter set NAL units can be used to update values of parameter sets for a video stream. The parameter update packets can be transmitted as Network Abstraction Layer Packets (NALP). A NALP consists of a NALP header (NALPH) and a NALP payload (NALPP). The NALPH is the first byte of the NALP. The NALPH itself distinguishes different NALP types and includes one bit (EI flag) indicating the presence of errors in the NALPP following the NALPH. EI flag set to 0 means that there is no known error in the following payload whereas a 1 indicates a corrupted payload and/or a corrupted NALP type.

A Parameter set NAL unit becomes valid synchronously with the decoding process according to the specific type of the parameter set NAL unit as follows: An update of an independent GOP parameter set takes place just before the first slice of the next independent GOP (i.e., the next IDERP NAL packet) is decoded. An update of picture and presentation parameter sets takes place just before the first slice of the next picture is decoded. An update of a slice parameter set takes place substantially immediately if at least one of the contained parameters is changed. However, slice parameter set identifier used in a picture may not be redefined with different parameter values within the same coded picture.

For certain broadcast applications, such as digital TV and multicast streaming with a huge number of possible receivers, new independent GOP parameter sets, which fall out of the scope of the pre-defined ones, are likely to be updated before each independent GOP is decoded, regardless of whether or not some of the contained parameters are changed, to enable decoding in terminals that just started receiving the coded data. Other parameter sets are updated before they are referred to in the coded data.

Figure 2:
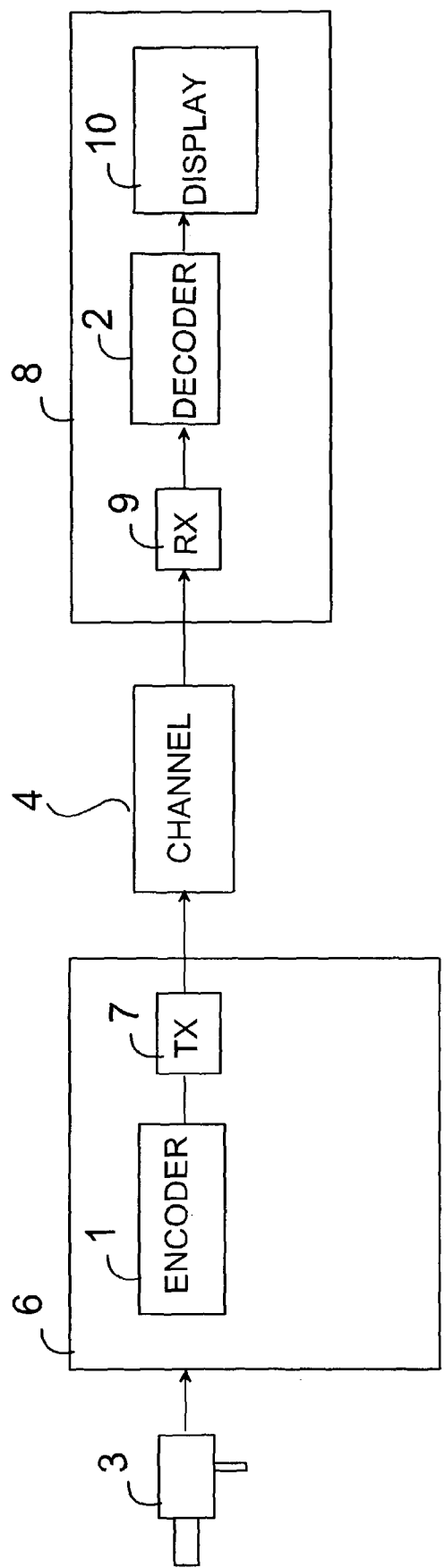
FIG. 2 depicts an advantageous embodiment of the system according to the present invention.
Figure 4:
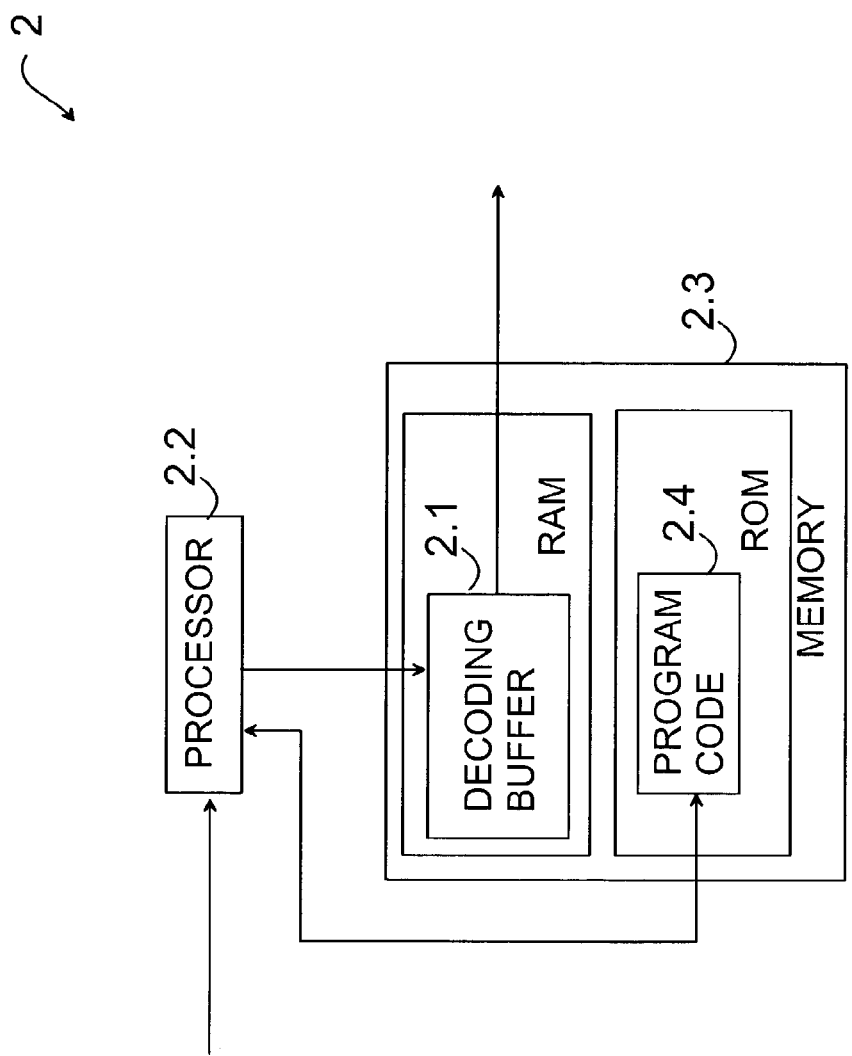
FIG. 4 depicts an advantageous embodiment of the decoder according to the present invention.

An advantageous embodiment of a system in which the present invention can be implemented is presented in FIG. 2. The pictures to be encoded can be, for example, pictures of a video stream from a video source 3, e.g. a camera, a video recorder, etc. The pictures (frames) of the video stream can be divided into smaller portions such as slices. The slices can further be divided into macroblocks and blocks. The encoder 1 selects proper parameter sets for use with the encoding process and sends the selected parameter sets to the decoder 2. The decoder stores the parameter sets to memory 2.3 (FIG. 4). If the decoder already has a correct parameter set, it is not necessary to transmit such parameter set to the decoder 2 but only an indication of the correct parameter set.

Figure 3:
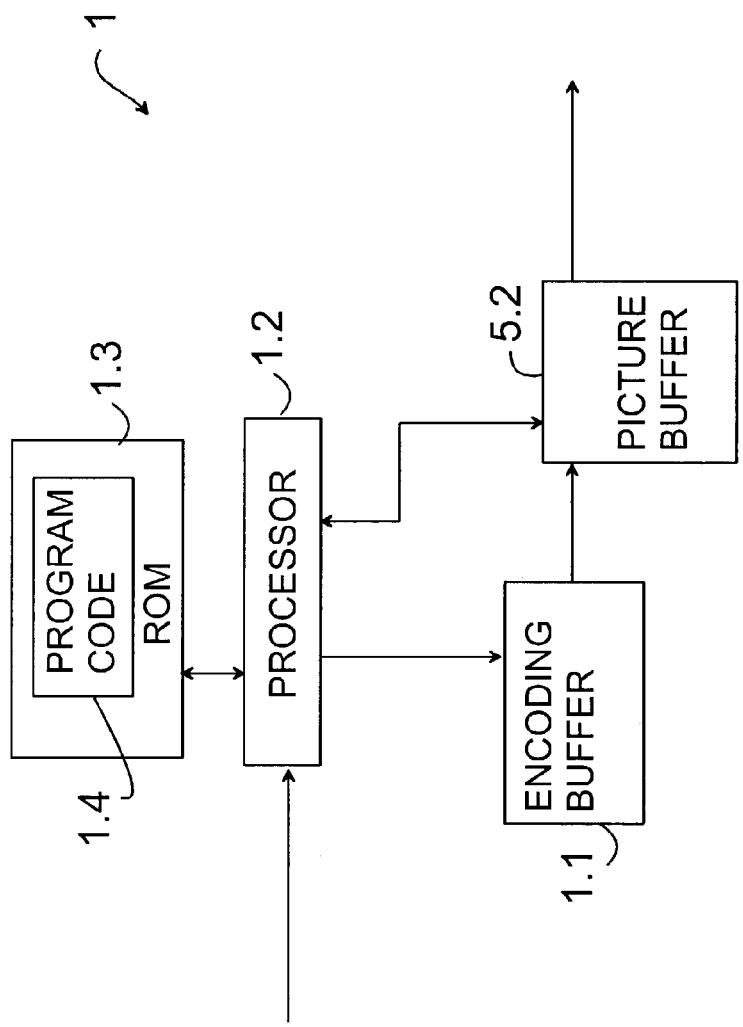
FIG. 3 depicts an advantageous embodiment of the encoder according to the present invention.

In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 3) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In the JVT coding standard the display order and the decoding order of the pictures are not necessarily the same, wherein the reference picture has to be stored in a buffer (e.g. in the encoding buffer 1.1) as long as it is used as a reference picture. The encoder 1 may also insert information on display order of the pictures into the bitstream.

From the encoding process the encoded pictures are moved to an encoded picture buffer 5.2, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the DPB 2.1 of the decoder 2 unless it is displayed substantially immediately after the decoding and is not used as a reference picture. Preferably both the reference picture buffering and the display picture buffering are combined and they use the same decoded picture buffer 2.1. This eliminates the need for storing the same pictures in two different places thus reducing the memory requirements of the decoder 2.

The decoder 2 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

It is obvious that the present invention is not limited solely to the above described embodiments but it can be modified within the scope of the appended claims.

The invention claimed is:

1. A method for encoding sequences of pictures into a bitstream, wherein parameters are defined in a parameter set and each picture comprises information of one or more slices, the method comprising:
   defining, in an encoder, parameter values in a sequence parameter set for a sequence of pictures;
   defining, in the encoder, parameter values in a picture parameter set for a picture; and
   defining, in the encoder, at least one picture parameter value in a slice header, the picture parameter value remaining unchanged at least in all slice headers of one picture.

2. The method according to claim 1, wherein the slice header is included with a reference to a picture parameter set.

3. The method according to claim 1, wherein the picture parameter set is included with a reference to a sequence parameter set.

4. The method according to claim 1, wherein the picture parameter value is selected from a group of information of a picture order count and a frame number.

5. The method according to claim 1, wherein the sequence parameter set and picture parameter set are transmitted less often than once per each picture.

6. A method for decoding sequences of pictures from a bitstream, wherein parameters are defined in a parameter set and each picture comprises information of one or more slices, the method comprising:
   recognizing, in a decoder, a sequence parameter set and forming at least one sequence parameter pertaining to a sequence using the parameter set;
   recognizing, in the decoder, a picture parameter set and forming at least one first picture parameter value pertaining to a picture using the parameter set;
   forming, in the decoder, at least one second picture parameter value using information of a slice header, the at least one second picture parameter value remaining unchanged at least in all slice headers of one picture; and
   using, in the decoder, the at least one second picture parameter value in decoding.

7. The method according to claim 6, wherein the slice header is included with a reference to a picture parameter set.

8. The method according to claim 6, wherein the picture parameter set is included with a reference to a sequence parameter set.

9. The method according to claim 6, wherein the second picture parameter value is selected from a group of information of a picture order count and a frame number.

10. An encoder for encoding sequences of pictures into a bitstream, wherein parameters are defined in a parameter set and each picture comprises information of one or more slices, the encoder comprising:
    a processor configured for:
    defining parameter values in a sequence parameter set for a sequence of pictures;
    defining parameter values in a picture parameter set for a picture; and
    defining at least one picture parameter value in a slice header, the picture parameter value remaining unchanged at least in all slice headers of one picture.

11. A decoder for decoding sequences of pictures from a bitstream, wherein parameters are defined in a parameter set and each picture comprises information of one or more slices, the decoder comprising:
    a processor configured for:
    recognizing a sequence parameter set for a sequence of pictures and forming at least one sequence parameter pertaining to a sequence using the parameter set for a picture;
    recognizing a picture parameter set and forming at least one first picture parameter value pertaining to a picture using the parameter set;
    forming at least one second picture parameter value using information of a slice header, the at least one second picture parameter value remaining unchanged at least in all slice headers of one picture; and
    using the at least one second picture parameter value in decoding.

12. A system comprising an encoder for encoding sequences of pictures into a bitstream, a decoder for decoding sequences of pictures from the bitstream, wherein parameters are defined in a parameter set and each picture comprises information of one or more slices, the encoder comprising:
    a processor configured for:
    defining parameter values in a sequence parameter set for a sequence of pictures;
    defining parameter values in a picture parameter set for a picture; and
    defining at least one picture parameter value in a slice header, the picture parameter value remaining unchanged at least in all slice headers of one picture;

and the decoder comprising:
  a processor configured for:
    recognizing a sequence parameter set for a sequence of pictures and forming at least one sequence parameter pertaining to a sequence using the parameter set;
    recognizing a picture parameter set for a picture and forming at least one first picture parameter value pertaining to a picture using the parameter set;
    forming at least one second picture parameter value using information of a slice header, the at least one second picture parameter value remaining unchanged at least in all slice headers of one picture; and
    using the at least one second picture parameter value in decoding.

13. The system according to claim 12, wherein a parameter set is stored in both the encoder and the decoder.

14. A transmitting device comprising an encoder for encoding sequences of pictures into a bitstream, wherein parameters are defined in a parameter set and each picture comprises information of one or more slices, the encoder comprising:
  a processor configured for:
    defining parameter values in a sequence parameter set for a sequence of pictures;
    defining parameter values in a picture parameter set for a picture; and
    defining at least one picture parameter value in a slice header, the picture parameter value remaining unchanged at least in all slice headers of one picture.

15. A receiving device comprising a decoder for decoding sequences of pictures from a bitstream, wherein parameters are defined in a parameter set and each picture comprises information of one or more slices, the decoder comprising:
  a processor configured for:
    recognizing a sequence parameter set for a sequence of pictures and forming at least one sequence parameter pertaining to a sequence using the parameter set;
    recognizing a picture parameter set for a picture and forming at least one first picture parameter value pertaining to a picture using the parameter set;
    forming at least one second picture parameter value using information of a slice header, the at least one second picture parameter value remaining unchanged at least in all slice headers of one picture; and
    using the at least one second picture parameter value in decoding.

16. A bitstream comprising:
  encoded pictures;
  sequence parameters in a sequence parameter set for a sequence of pictures;
  picture parameter values in a picture parameter set for a picture;
  information of a slice comprising a slice header; and
  at least one picture parameter value in the slice header, the picture parameter value remaining unchanged at least in all slice headers of one encoded picture.

17. The bitstream according to claim 16, wherein the slice header is included with a reference to a picture parameter set.

18. The bitstream according to claim 16, wherein the picture parameter set is included with a reference to a sequence parameter set.

19. The bitstream according to claim 16, wherein the picture parameter value is selected from a group of information of a picture order count and a frame number.

20. A computer readable storage medium embedded with a computer program comprising programming code for execution on a processor, the programming code for encoding sequences of pictures into a bitstream, wherein parameters are defined in a parameter set and each picture comprises information of one or more slices, and the programming code for:
  defining parameter values in a sequence parameter set for a sequence of pictures;
  defining parameter values in a picture parameter set for a picture; and
  defining at least one picture parameter value in a slice header, the picture parameter value remaining unchanged at least in all slice headers of one picture.

21. A computer readable storage medium embedded with a computer program comprising programming code for execution on a processor, the programming code for decoding sequences of pictures from a bitstream, wherein parameters are defined in a parameter set and each picture comprises information of one or more slices, and the programming code for:
  recognizing a sequence parameter set for a sequence of pictures and forming at least one sequence parameter pertaining to a sequence using the parameter set;
  recognizing a picture parameter set for a picture and forming at least one first picture parameter value pertaining to a picture using the parameter set;
  forming at least one second picture parameter value using information of a slice header, the at least one second picture parameter value remaining unchanged at least in all slice headers of one picture; and
  using the at least one second picture parameter value in decoding.

22. An encoder for encoding sequences of pictures into a bitstream, wherein parameters are defined in a parameter set and each picture comprises information of one or more slices, the encoder comprising:
  means for defining parameter values in a sequence parameter set for a sequence of pictures;
  means for defining parameter values in a picture parameter set for a picture; and
  means for defining at least one picture parameter value in a slice header, the picture parameter value remaining unchanged at least in all slice headers of one picture.

23. A decoder for decoding sequences of pictures from a bitstream, wherein parameters are defined in a parameter set and each picture comprises information of one or more slices, the decoder comprising:
  means for recognizing a sequence parameter set for a sequence of pictures and forming at least one sequence parameter pertaining to a sequence using the parameter set for a picture;
  means for recognizing a picture parameter set and forming at least one first picture parameter value pertaining to a picture using the parameter set;
  means for forming at least one second picture parameter value using information of a slice header, the at least one second picture parameter value remaining unchanged at least in all slice headers of one picture; and
  means for using the at least one second picture parameter value in decoding.

* * * * *